US008381127B2

(12) United States Patent
Singh et al.

(10) Patent No.: US 8,381,127 B2
(45) Date of Patent: Feb. 19, 2013

(54) METHODS, SYSTEMS, AND COMPUTER PROGRAM PRODUCTS FOR DISPLAYING WINDOWS ON A GRAPHICAL USER INTERFACE BASED ON RELATIVE PRIORITIES ASSOCIATED WITH THE WINDOWS

(75) Inventors: Mona Singh, Cary, NC (US); Jared S. Fry, Boston, MA (US)

(73) Assignee: Scenera Technologies, LLC, Portsmouth, NH (US)

( * ) Notice: Subject to any disclaimer, the term of this patent is extended or adjusted under 35 U.S.C. 154(b) by 1839 days.

(21) Appl. No.: 11/346,529

(22) Filed: Feb. 2, 2006

(65) Prior Publication Data

US 2007/0180401 A1      Aug. 2, 2007

(51) Int. Cl.
*G06F 3/048* (2006.01)
(52) U.S. Cl. ........ 715/803; 715/790; 715/791; 715/792; 715/794; 715/797
(58) Field of Classification Search .................. 715/803, 715/790–797
See application file for complete search history.

(56) References Cited

U.S. PATENT DOCUMENTS

| | | | |
|---|---|---|---|
| 4,783,648 A | 11/1988 | Homma et al. | |
| 4,789,962 A * | 12/1988 | Berry et al. | ................... 715/715 |
| 5,712,995 A | 1/1998 | Cohn | |
| 5,838,318 A | 11/1998 | Porter et al. | |
| 5,912,668 A * | 6/1999 | Sciammarella et al. | ...... 715/788 |
| 6,008,809 A | 12/1999 | Brooks | |

OTHER PUBLICATIONS

"Actual Title Buttons," Actual Tools, http://www.actualtools.com/titlebuttons/, pp. 1-6 (Sep. 23, 2005).
"Actual Transparent Window," Actual Tools, http://www.actualtools.com/transparentwindow/, pp. 1-4 (Sep. 23, 2005).
"Actual Window Guard," Actual Tools, http://www.actualtools.com/windowguard/, pp. 1-5 (Sep. 23, 2005).
"Actual Window Manager," Actual Tools, http://www.actualtools.com/windowmanager/, pp. 1-6 (Sep. 23, 2005).
"Actual Window Menu," Actual Tools, http://www.actualtools.com/windowmenu/, pp. 1-5 (Sep. 23, 2005).
"Actual Window Minimizer," Actual Tools, http://www.actualtools.com/windowminimizer/, pp. 1-5 (Sep. 23, 2005).
"Actual Window Rollup," Actual Tools, http://www.actualtools.com/windowrollup/, pp. 1-3 (Sep. 23, 2005).
"Active Window Tracking," Registry Guide for Windows, http://www.winguides.com/registry/display.php/18/, pp. 1-2 (Copyright 2005).

(Continued)

*Primary Examiner* — Robert Stevens
*Assistant Examiner* — Daniel Um

(57) ABSTRACT

Methods, systems, and computer program products for displaying windows on a graphical user interface based on relative priorities associated with the windows are disclosed. According to one method, relative priorities of a plurality of windows of a graphical user interface are determined. Further, relative priorities of a plurality of portions of at least one of the windows are determined. The windows are automatically arranged on the graphical user interface based on the relative priorities of the windows and based on the relative priorities of the portions. A higher priority window may cover a lower priority portion of a lower priority window to provide for a simultaneous viewing of the higher priority window and a higher priority portion of the lower priority window.

40 Claims, 12 Drawing Sheets

OTHER PUBLICATIONS

"Change the Application Focus Settings," Registry Guide for Windows, http://www.winguides.com/registry/display.php/540/, pp. 1-2 (Copyright 2005).

"WinArranger Free 1.11," ManageBytes Software, http://www.softplatz.com/Soft/Desktop/Desktop-Management/WinArranger-Free.html, pp. 1-2 (Copyright 2005).

"Auto Window Manager 1.2," Eusing Software, http://www.eusing.com/WindowManager/WindowManager.htm, pp. 1-2 (Copyright 2004-2005).

"BKResizer v1.1.3," http://users.tpg.com.au/hbk02542/products/bkresizer/about.htm, pp. 1-4 (Copyright 2003-2005).

SOHO Evolution, LLC, "WinTiles Plus," 1000files.com, pp. 1-2 (Copyright 2002-2005).

ZMover, "ZMover: Desktop Layout Manager," Net-Sharing.com, pp. 1-2 (Copyright 2000-2005).

Badros et al., "Cassowary—A Constraint Solving Toolkit," http://www.cs.washington.edu/research/constraints/cassowary/, pp. 1-3 (Feb. 12, 2003).

Badros et al., "SCWM: An Intelligent Constraint-Enabled Window Manager," American Association for Artificial Intelligence, pp. 1-8 (Copyright 2000).

Badros et al., "Scheme Constraints Window Manager," SCWM, http://scwm.sourceforge.net#introduction, pp. 1-8 (Publication Date Unknown).

Constraints Screenshot, http://scwm.sourceforge.net/constraints-schreenshot.gif (Publication Date Unknown).

"Elastic Windows for Rapid Multiple Window Management," Human-Computer Interaction Lab/University of Maryland, http://www.cs.umd.edu/hcil/elastic-windows/, pp. 1-2 (Publication Date Unknown).

\* cited by examiner

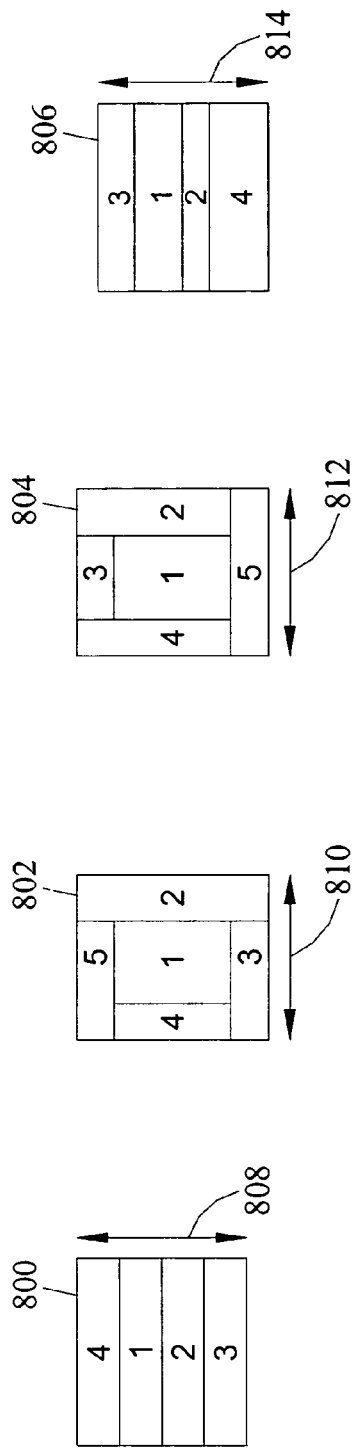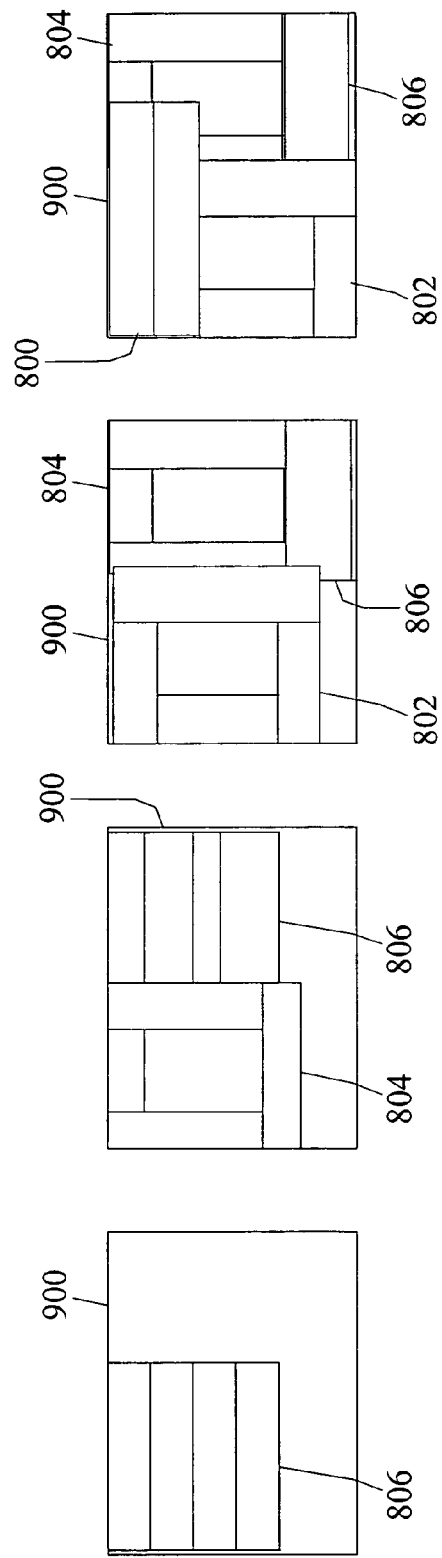

METHODS, SYSTEMS, AND COMPUTER PROGRAM PRODUCTS FOR DISPLAYING WINDOWS ON A GRAPHICAL USER INTERFACE BASED ON RELATIVE PRIORITIES ASSOCIATED WITH THE WINDOWS

TECHNICAL FIELD

The subject matter described herein relates to methods, systems, and computer program products for displaying windows on a graphical user interface (GUI). More particularly, the subject matter described herein relates to methods, systems, and computer program products for displaying windows on a GUI based on relative priorities associated with the windows.

BACKGROUND

Computers and other electronic devices are typically operable to execute multiple applications concurrently. For example, a computer may concurrently execute a word processing application, a web browser application, and an e-mail application. One or more of these multiple applications can be simultaneously displayed to a user using separate windows of a GUI of the computer. Further, each of these multiple applications can have multiple windows displayed on the GUI.

The concurrent display of multiple windows can be beneficial to a user when the user is working on a single task associated with each of the displayed windows. In this instance, the user can view information shown by the windows at the same time. For example, in a video conference, a user may desire to simultaneously display windows for a video conferencing application, a word processing application, and a spreadsheet application.

One problem with the simultaneous display of multiple windows is the arrangement of the windows on the GUI. The display area of the graphical user interface available to windows is limited. Therefore, it is desirable to position, size, and/or configure the windows on the GUI in order to maximize the benefit of the display area of the GUI for the user.

One existing method for arranging the display of multiple windows is to let the user arrange the windows manually to a desirable configuration. The user could rearrange the windows by re-sizing the windows and/or re-positioning the windows on the display. This manual rearrangement of the windows can be an inconvenient and time-consuming process.

Techniques have been developed for automatically rearranging windows on the GUI. For example, one system arranges windows on a display screen based on a class designation associated with the windows. However, the space on a display screen may not be optimally utilized because components within the windows are not arranged based on their importance to a user. For example, a portion within a window that is unimportant to a user may be arranged on a display screen in a position that is more prominent than a more important portion of the window. In addition, conventional systems that arrange windows based on display class do not dynamically update the arrangement of the windows as the relative importance of the windows or portions within the windows changes.

In view of the shortcomings of existing techniques for displaying windows, there exists a need for improved methods, systems, and computer program products for displaying windows on a GUI based on a relationship of the windows with one another.

SUMMARY

According to one aspect, the subject matter described herein includes a method for displaying windows on a GUI. The method includes determining relative priorities of a plurality of windows of a GUI. Further, the method includes determining relative priorities of a plurality of portions of at least one of the windows. The windows may be automatically arranged in the GUI based on the relative priorities of the windows and based on the relative priorities of portions of the windows. A higher priority window covers a lower priority portion of a lower priority window to provide for a simultaneous viewing of the higher priority window and a higher priority portion of the lower priority window.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, programmable logic devices, and downloadable electrical signals. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Exemplary embodiments of the subject matter will now be explained with reference to the accompanying drawings, of which:

FIGS. 8A-8D are screen displays of exemplary windows having different priorities and portions within the windows having different priorities according to one embodiment of the subject matter described herein;

FIGS. 9A-9D are screen displays of a sequential arrangement of the windows shown in FIGS. 8A-8D according to an embodiment of the subject matter described herein;

DETAILED DESCRIPTION

Figure 1:
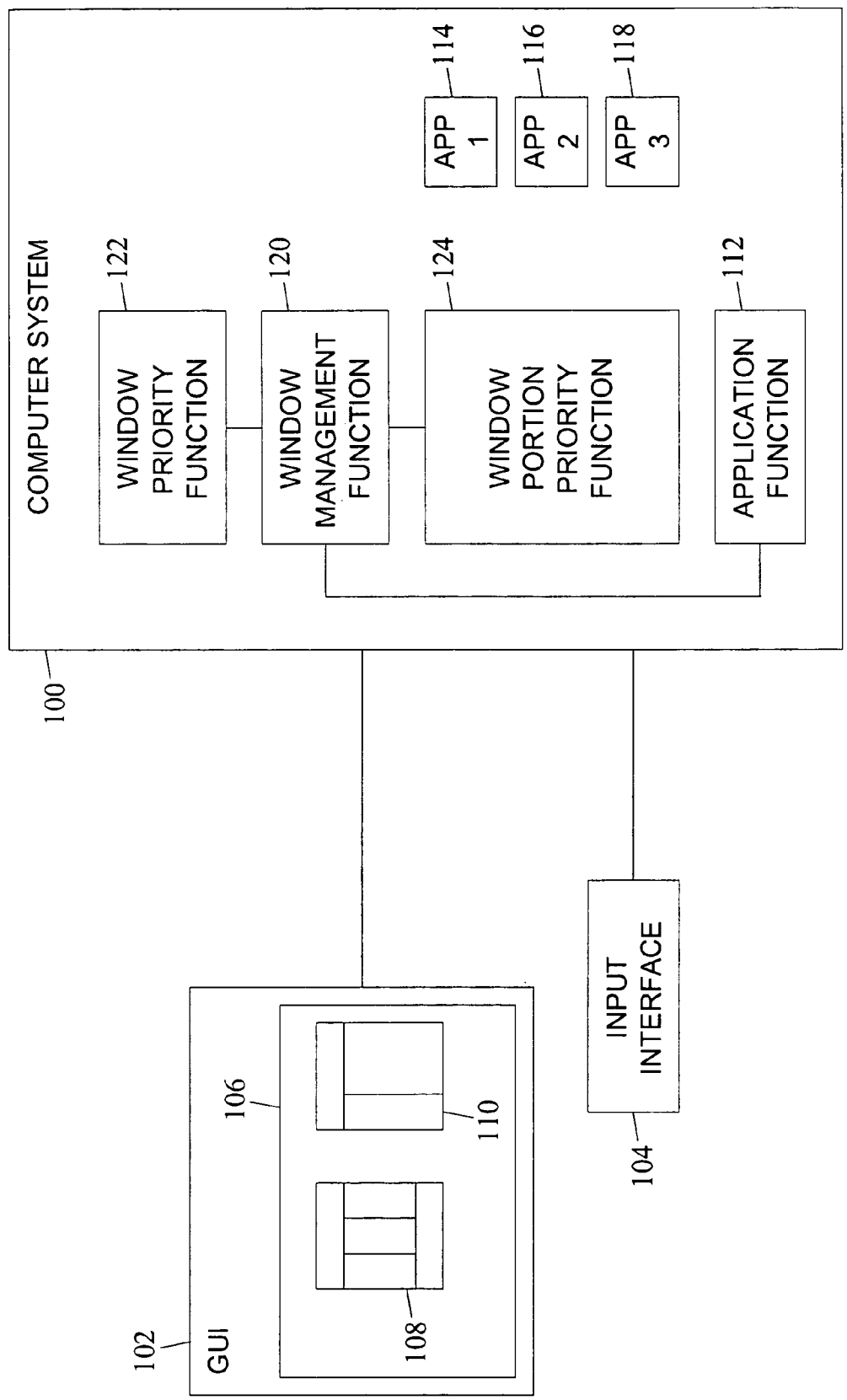
FIG. 1 is a block diagram illustrating an exemplary computer system for displaying windows on a GUI according to an embodiment of the subject matter described herein.

According to one aspect, a system for displaying windows on a GUI may be implemented as hardware, software, and/or firmware components executing on one or more components of a system having a GUI. FIG. 1 illustrates an example of a computer system 100 for displaying windows on a GUI 102 according to an embodiment of the subject matter described herein. Computer system 100 may be any suitable system for displaying one or more windows on a GUI, such as a personal computer, mobile phone, personal digital assistant, and the like. The displayed windows may be associated with one or more applications. An application may provide instructions for displaying a window on GUI 102. Referring to FIG. 1, computer system 100 may include an input interface 104 by which a user inputs data. For example, input interface 104 may be a keyboard, a keypad, a touch screen interface, a tablet PC interface, or a mouse. The user can input data into input interface 104 for selecting one or more windows for display on GUI 102 and interacting with the displayed windows.

Figure 2:
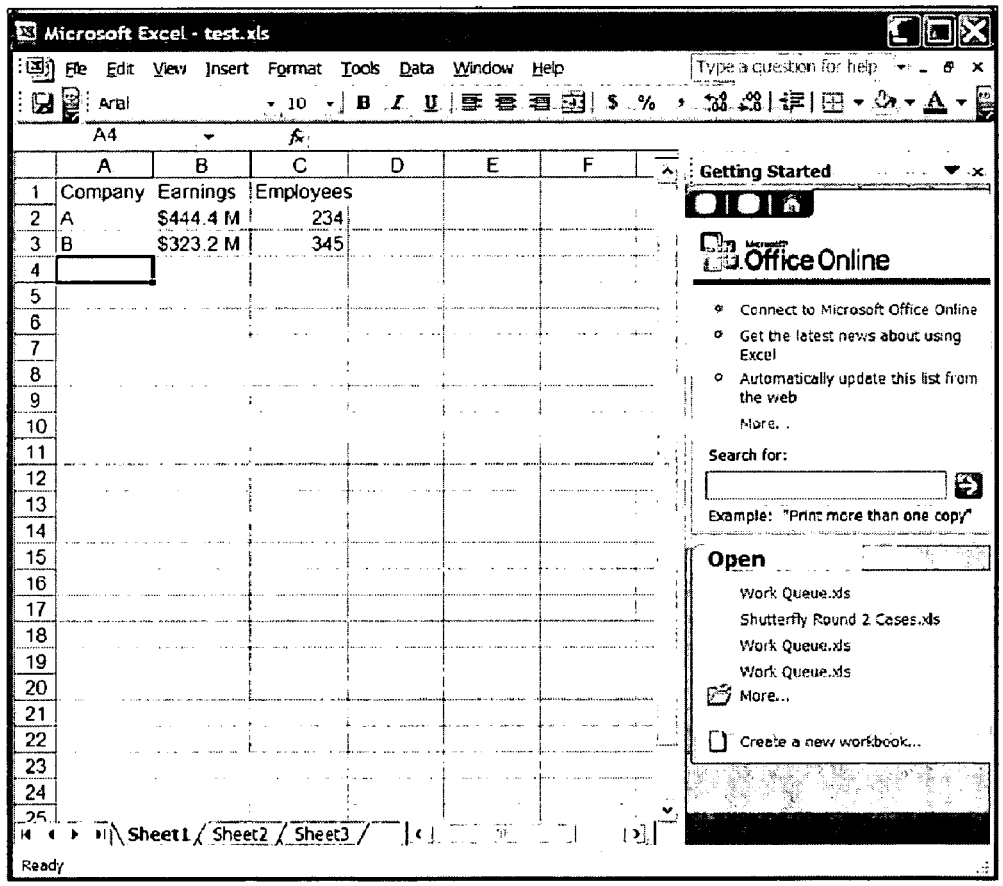
FIG. 2 is a screen display of an exemplary window for displaying data and images associated with a spreadsheet application.

A window may be a user interface through which a user interacts with an application or an instance of an application. For example, a window may be one or more graphical images and/or data that appears on a display screen and corresponds to an application. FIG. 2 is a screen display of an exemplary window for displaying data and images associated with a spreadsheet application. Referring to FIG. 2, the spreadsheet application is the Microsoft Excel spreadsheet software available from Microsoft Corporation of Redmond, Wash. A user may utilize an input interface for editing or otherwise interacting with the data and/or images displayed in the window. Further, the user may also change the dimensions or other characteristics of the display of the window. For example, the user may resize the window. In another example, the user may also selectively remove or adjust the size of a portion of the window in order to increase the available display space of the GUI. The size of a portion of a window may also be increased if space on the GUI provides.

Referring again to FIG. 1, GUI 102 may be any suitable interface for visually representing programs and files with graphical images, such as icons, menus, and dialog boxes on a screen. Examples of GUIs suitable for use with embodiments of the subject matter described herein include any GUIs that represent files and programs using windows. Some current examples of GUIs that use windows are the desktop interfaces provided by MICROSOFT WINDOWS®, Red Hat LINUX®, and the X-Windows System developed by the Massachusetts Institute for Technology. In addition to these GUIs, the subject matter described herein may also be suitable for use with windows-based GUIs designed for mobile phones, PDAs, appliances, or other devices with visual interfaces.

In the illustrated example, GUI 102 may include a display area 106 for displaying windows 108 and 110 for view by the user. Windows 108 and 110 may also include a plurality of portions, shown by the lines within each window, that are of different relative importance to the user. For example, a portion in which the user is currently reading or entering text may be of higher importance than a taskbar portion.

System 100 may include an application function 112 for storing, managing, and executing one or more applications. For example, function 112 may simultaneously execute applications 114, 116, and 118. An application may be an executable program. Applications may or may not operate with a user interface. A user may interact with an instance created by an application. For example, a spreadsheet application may execute an instance of a file for interaction by the user. A spreadsheet containing data associated with the file may be displayed in a window of GUI 102.

Each application 114, 116, and 118 may be associated with one or more windows displayed on display area 106. For example, applications 114 and 116 may be associated with windows 108 and 110, respectively. Data, such as text and images associated with the applications, may be displayed within windows on display area 106. For example, spreadsheet data generated by an application may be presented to a user in a window displayed on GUI 102.

Further, system 100 includes means for automatically arranging windows in a graphical user interface based on relative priorities of the windows and based on relative priorities of portions of at least one of the windows. For example, system 100 may include a window management function 120 for automatically arranging windows on GUI 102 based on the relative priorities of windows and based on the relative priorities of portions of at least one of the windows. Function 120 may arrange the windows such that a higher priority window covers a lower priority portion of a lower priority window to provide for a simultaneous viewing of the higher priority window and a higher priority portion of the lower priority window. The windows may be arranged by positioning (or repositioning) the windows, sizing one or more windows, and/or the contents of one or more portions of the windows. For example, a window may be resized by changing the size of the window in a vertical direction and/or horizontal direction. In another example, a window may be positioned at a predetermined position with respect to another window. In another example, a portion of a window may be covered by another window based on the relative priorities of all of the windows on GUI 102 and the relative priorities of portions of the window. A window or portion of a window may be positioned and/or sized such that a higher priority window or portion of the higher priority window is viewable by the user.

System 100 may include a means for determining relative priorities of windows of a GUI. For example, system 100 may include a window priority function 122 for determining relative priorities of windows of GUI 102. Relative priorities of windows may be determined based on a comparison of priorities assigned to two or more windows. The priorities assigned to each of the windows may be set by the user, the computer system, or by both the user and the computer system. For example, a user may assign a word processing window a higher priority than an e-mail management window. An application associated with the window may provide information about the window's priority to function 122. For example, the application may provide to functions 122 and 124 one or more priority identifiers for identifying the priority of a window and/or the priority of portions of the window.

System 100 may include a means for determining relative priorities of portions of at least one of the windows. For example, system 100 may include a window portion priority function 124 for determining relative priorities of portions of at least one of the windows of GUI 102. Relative priorities of portions of a window may be determined based on a comparison of priorities assigned to the portions of the window. The priorities of portions of each window may be assigned by the user, the computer system, or by both the user and the computer system. For example, a higher priority may be assigned to a portion of a word processing window in which text is being entered than an unused portion of the word processing window or of another window. In another example, a photographic image in a photography editing window may have a higher priority than a portion of the window associated with saving files and printing images.

According to one embodiment, system 100 may dynamically adjust the display of windows on GUI 102 based on events affecting the priority of one of the windows. GUI 102 may simultaneously display windows 108 and 110. Further, the sizes and/or positions of the windows may be set according to relative priorities of the windows. Window management function 120 may detect an event affecting the relative priority of one of the displayed windows. For example, the event may be that one of the windows is being accessed by a user. The window being accessed may then be associated to have a higher priority than the other window. In another example, the event may be that one of the windows is being closed by a user. On detection of an event affecting the relative priority of one of the displayed windows, function 120 can dynamically adjust at least one of the sizes and positions of the windows based on the event.

Figure 3:
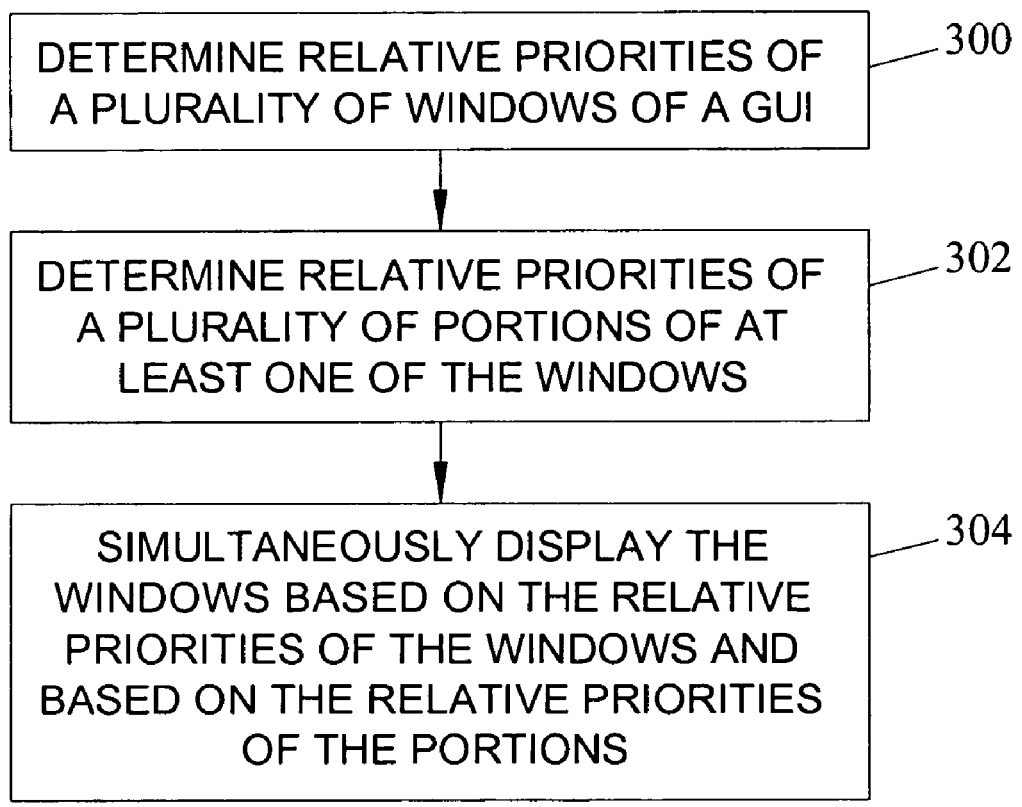
FIG. 3 is a flow chart of an exemplary process for displaying windows on a GUI according to an embodiment of the subject matter described herein.

FIG. 3 is a flow chart illustrating an exemplary process for displaying windows on a GUI according to an embodiment of the subject matter described herein. Referring to FIG. 3, block 300 includes determining relative priorities of a plurality of windows of a GUI. In block 302, relative priorities of a plurality of portions of at least one of the windows are determined. The windows are automatically arranged on the GUI based on the relative priorities of the windows and based on the relative priorities of the portions (block 304). A higher priority window may cover a lower priority portion of a lower priority window to provide for a simultaneous viewing of the higher priority window and a higher priority portion of the lower priority window.

Figure 4A:
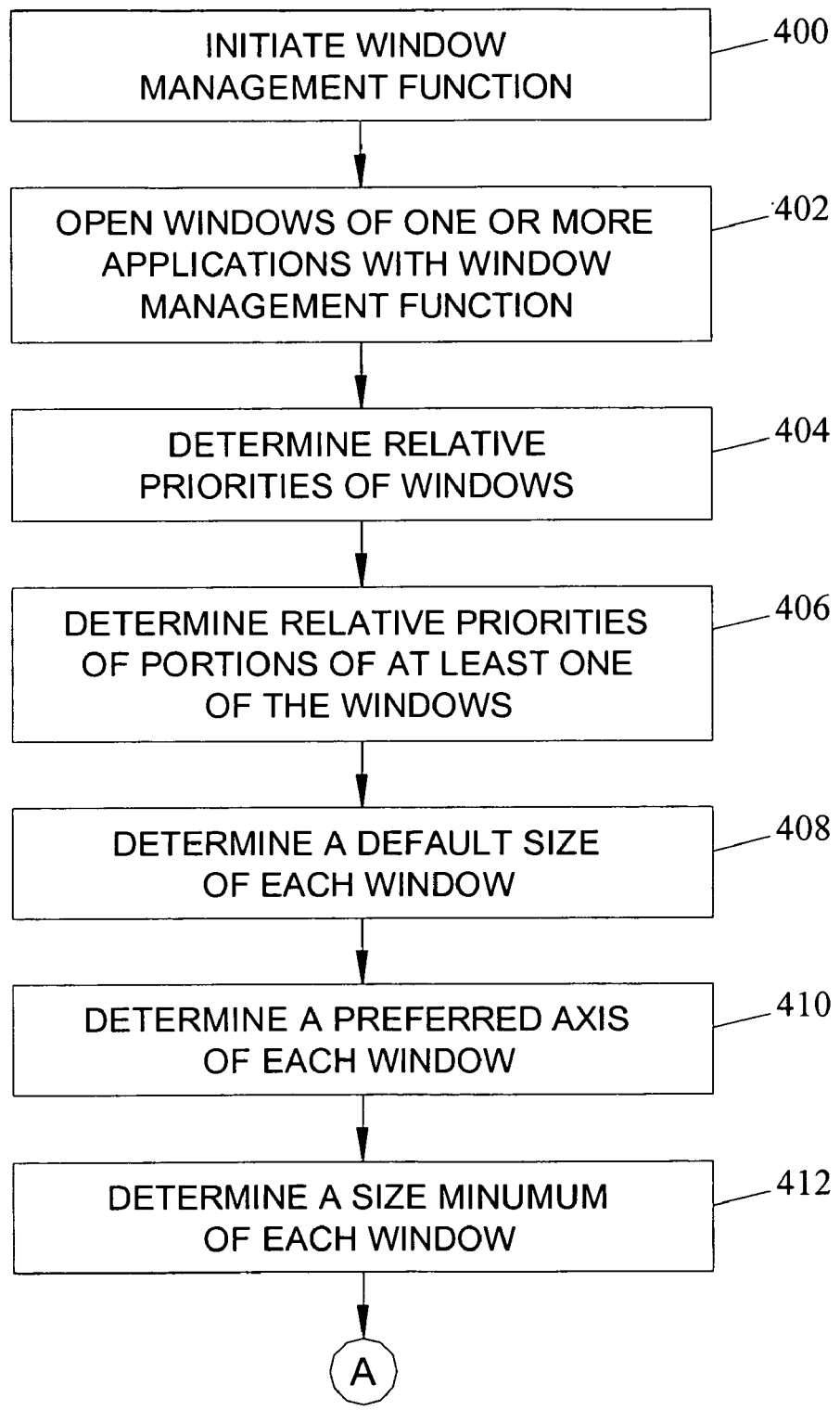
FIGS. 4A and 4B are a flow chart of another exemplary process for displaying windows on a GUI shown in FIG. 1 according to an embodiment of the subject matter described herein.
Figure 4B:
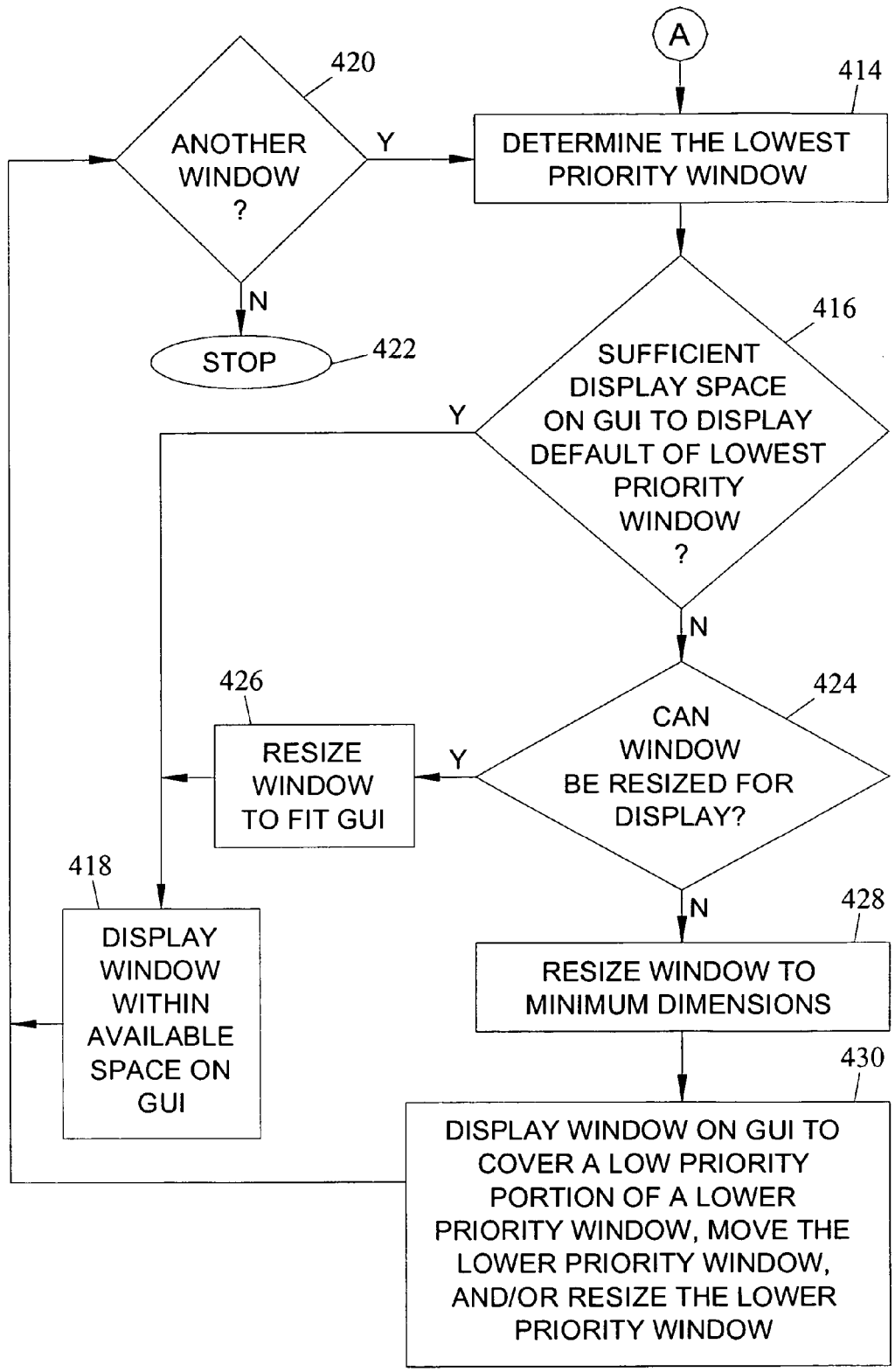

FIGS. 4A and 4B are a flow chart illustrating another exemplary process for displaying windows on GUI 102 shown in FIG. 1 according to an embodiment of the subject matter described herein. The relative priorities of each window in a set may be provided by a user. The user may select the relative priorities of windows for carrying out a task. The relative priorities of the windows may be based on the task. Alternatively, the priorities of the windows may be set by the application associated with each window. Referring to FIG. 4A, block 400 includes initiating window management function 120 for selecting windows to be arranged on GUI 102 according to their relative priorities. Function 120 can be initiated by selecting a display organizer icon on GUI 102. When function 120 is initiated, a display organizer icon may be displayed on GUI 102. The display organizer icon may be associated with a display taskbar such as the display taskbar displayed on a GUI by any of the windows operating systems available from Microsoft Corporation. For example, the display organizer icon may be positioned adjacent to the display taskbar or otherwise positioned near to the display taskbar.

Figure 5:
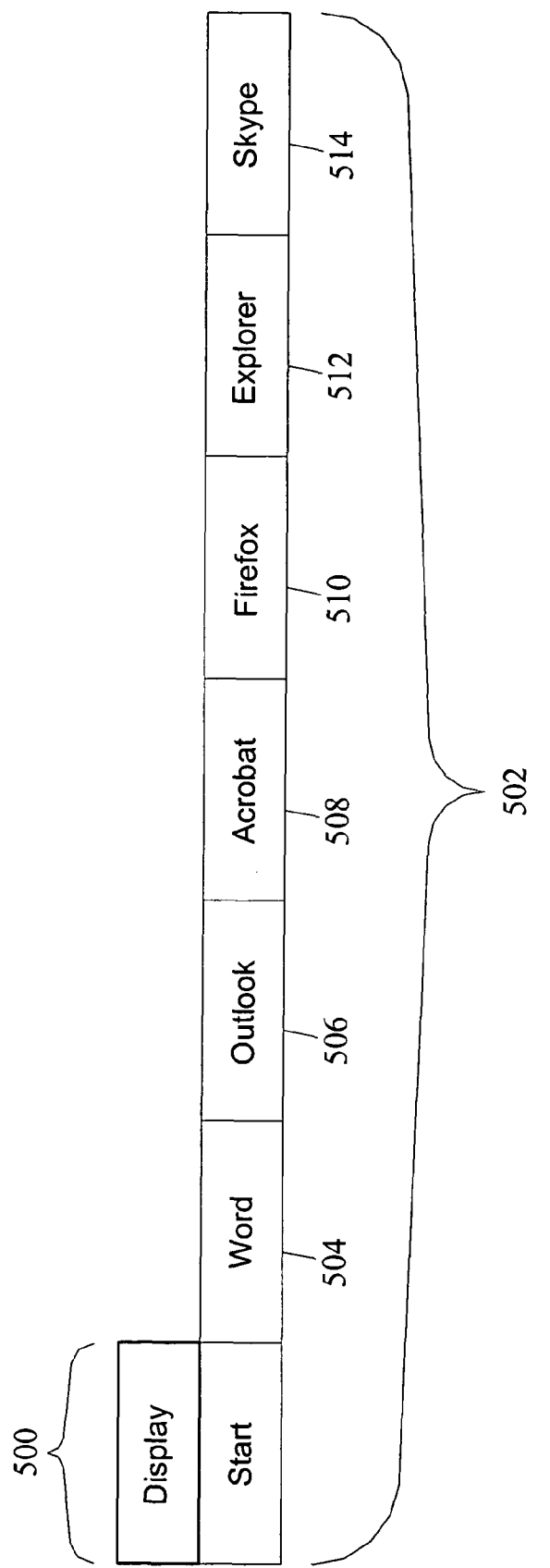
FIG. 5 is a block diagram of an exemplary display organizer icon and a display taskbar according to an embodiment of the subject matter described herein.

FIG. 5 is a block diagram illustrating an exemplary display organizer icon 500 and display taskbar 502 according to one embodiment of the subject matter described herein. Referring to FIG. 5, display organizer icon 500 is positioned adjacent to taskbar 502. Taskbar 502 may include various sub-icons that represent and indicate applications that are currently being executed by a computer system. For example, taskbar 502 includes sub-icons 504, 506, 508, 510, 512, and 514. The sub-icons can be selected for displaying a window of the corresponding application. None of the applications being executed by the computer system have been added to display organizer icon 500.

Figure 6:
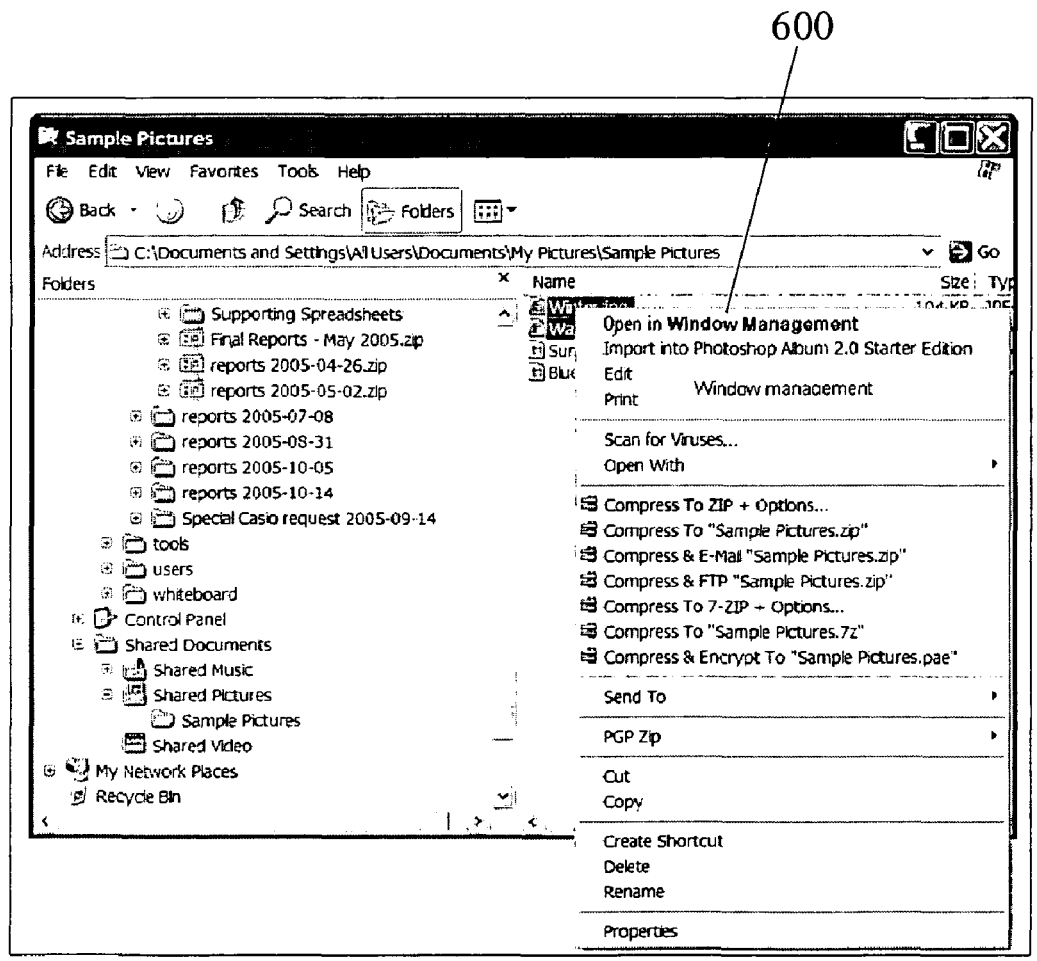
FIG. 6 is a screen display of an exemplary window including a menu option for opening a file in a window management function according to an embodiment of the subject matter described herein.

Referring again to FIG. 4A, windows of applications may be opened with window management function 120 (block 402). The windows opened may be a set of windows designated by the user for automatic arrangement by function 120 on GUI 102. A user may open a window of an application with function 120 by selecting a file to open and selecting a menu option for opening the application in function 120. FIG. 6 is a screen display of an exemplary window including a menu option for opening a file in a window management function according to one embodiment of the subject matter described herein. Referring to FIG. 6, the user can use a mouse to move a cursor for selecting the menu option "Open in Window Management" 600 for opening a file with the window management function.

The opened application may generate a sub-icon representation of the application in the display taskbar and a sub-icon representation of the application in a display organizer icon. In one embodiment, the same open application may have an instance residing as normal in the computer's operating system and an instance residing in the window management function 120. The windows may be separate in their display parameters while maintaining synchronized contents or data. An instance of the application may be closed in function 120 without affecting the instance of the application in the computer's operating system. Further, a user may alternate between a window of the application as displayed by the different instances. Further, the application may remain open when function 120 is closed.

Figure 7:
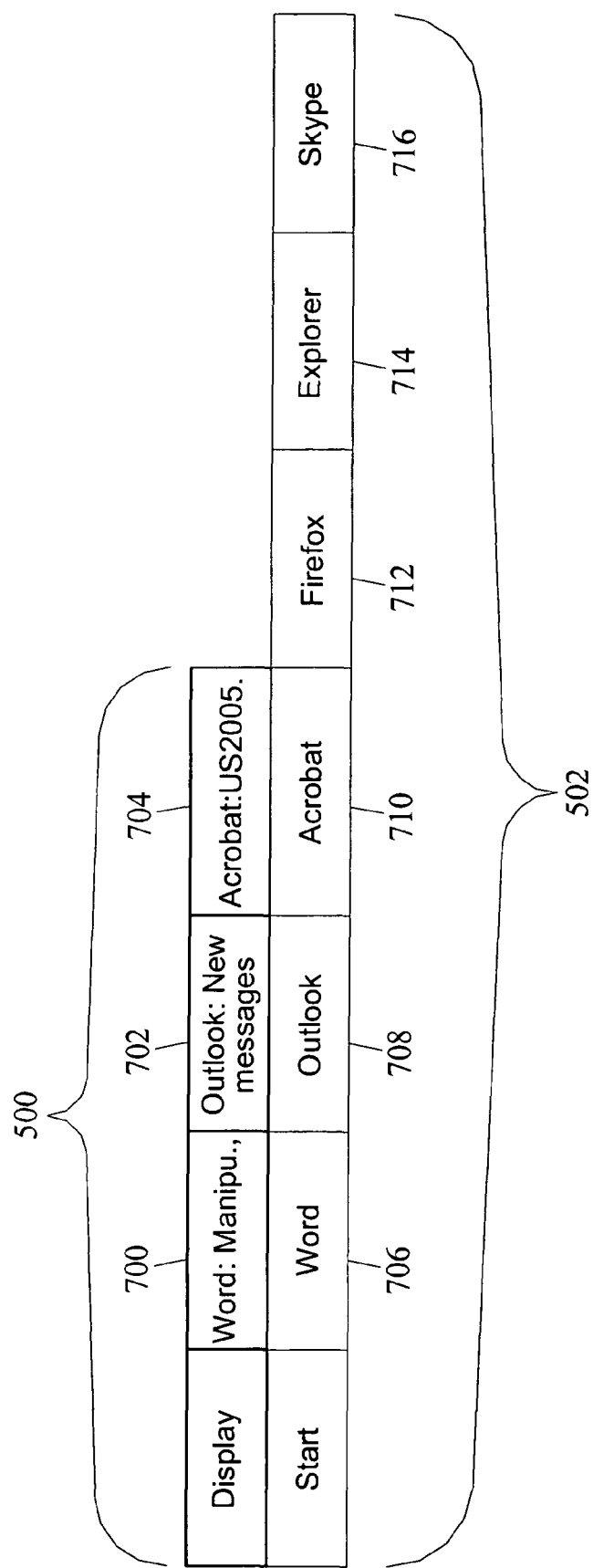
FIG. 7 is a block diagram of an exemplary display organizer icon and a display taskbar populated with application windows according to an embodiment of the subject matter described herein.

FIG. 7 illustrates a screen display of display organizer icon 500 and display taskbar 502 simultaneously maintaining instances of applications. Referring to FIG. 7, display organizer icon 500 includes sub-icons 700, 702, and 704 that correspond to instances of three different applications having windows managed by function 120. Display taskbar 502 includes sub-icons 706, 708, 710, 712, 714, and 716 that correspond to instances of six different applications having windows managed by a computer's operating system. Sub-icons 700, 702, and 704 are associated with the same applications as sub-icons 706, 708, and 710, respectively.

In one example, a window may be provided to windows management function 120 for management by "dragging and dropping" a sub-icon from a display taskbar onto the display organizer icon. For example, a sub-icon of a window may be shown on a display such as in a display taskbar. The sub-icon may be selected and moved to the display organizer icon to add the window to function 120 for management and arrangement with other windows on GUI 102.

In another example, a window may be provided to function 120 for management by a combination of use of a keyboard keystrokes, mouse buttons and/or mouse positioning. It is envisioned that a variety of key combinations may be suitable for providing a window to function 120 for management. These key combinations include selecting items on a taskbar associated with the windows (e.g., depressing a shift button or a control button) with the mouse, right clicking the mouse, and selecting an "add to Window Management" button. In another example, a window's title bars may be selected for moving the window rather than the taskbar items associated with the windows.

In another example, a window may be provided to function 120 for management by selecting a display organizer icon of an open application or an unopened file. The window may be provided to function 120 by moving the window's title bar to an icon associated with function 120.

Referring again to FIG. 4A, in block 404, window priority function 122 determines relative priorities of windows. The relative priorities of windows may be determined based on an order that the windows are selected or positioned in the display organizer icon. For example, when a window A is opened before a window B, window A may be assigned a higher priority than window B. In another example, a user may selectively assign a priority number or other indicia to a window such that the window may be compared to other windows having an assigned priority. After windows have been added to the display organizer icon, the windows' priorities can be reordered by arranging the windows in the display organizer icon in a different order from the order that the windows were added to the display organizer icon. Further, window priorities may be adjusted by adding new windows to the display organizer icon. The position of sub-icon of a window in the display organizer may determine its relative priority. For example, a sub-icon may have a higher priority than all sub-icons positioned to its right.

In block 406, window portion priority function 124 determines relative priorities of portions of at least one of the windows. As stated above, relative priorities of portions of a window may be determined by comparing priorities associated with two or more portions of a window. For example, in a graphics application window (such as ACROBAT® software available from the Adobe Systems Incorporated of San Jose, Calif.), the main contents portion of the window (e.g., the portion including graphics or text contained in an opened file) may have a higher priority than the search bar and thumbnail portions of the window. Further, for example, a portion of a window that is selected by a user (e.g., with a cursor or another suitable input device) may have a higher priority than any other portion of the window and displayed window.

In block 408, window management function 120 may determine a default size of each window. For example, if a window has not previously been opened by a user, a default size of a window may be the default size of the window provided by the application associated with the window. The default size of a window may depend upon amount of that is being conveyed to the user by the window. For example, the default size for a chat application window may be small as compared to the total display area of a GUI. Conversely, the default size for a word processing application window may be large as compared to the total display area of a GUI. In another example, for a window that has been previously opened, the default size of the window may be the size of the window when the window was last closed. In another example, when a window is a copy of another window, the window copy may be sized the same as the size of the window that was copied.

In block 410, function 120 may determine a preferred axis of each window. The preferred axis of a window may be provided by the application associated with the window. The preferred axis may be the dimension of the window that stretches or compresses more than another axis of the window. For example, in a window of a word processing application, the window may permit scrolling in the vertical direction. The user may also have scrolled in the vertical direction. In such windows, the vertical direction may be the preferred axis. Conversely, in a window of a spreadsheet application, the window may permit scrolling in a horizontal direction. In such windows, the horizontal direction may be the preferred axis. For windows having scroll bars for the horizontal and vertical directions, the dimensions of the scroll bars may be compared to determine the major preferred axis.

In block 412, function 120 may determine a minimum size of each window. The minimum size of a window may be provided by the application associated with the window. For example, a minimum dimension of a window in the vertical direction and/or the horizontal direction may be determined. In one example of a word processing application window, the minimum size may be equal to the text width in the horizontal direction and five lines in the vertical direction. In an image editing application window, the minimum size may be the size of an object image being edited.

Blocks 414-430 represent a process for automatically arranging the designated set of windows for display on GUI 102. The process of blocks 414-430 may be performed by function 120 for each window in a sequential order from the lowest priority window to the highest priority window in the set. In block 414, function 120 may determine the lowest priority window for display among the set of windows designated for display. In block 416, function 120 may determine whether sufficient display space is available on GUI 102 for displaying a default of the lowest priority window in the set that has not yet been arranged by the process on GUI 102 or otherwise processed. If sufficient display space is available, the window is positioned within the available space of GUI 102 (block 418). The window may be repositioned, resized, and/or a portion of the window covered based on the processing of higher priority windows in the set.

In block 420, it is determined whether another window is in the set that has not yet been arranged on GUI 102 by the process or otherwise processed. If there is not another window for display, the process stops (block 422). Otherwise, if there is another window for display, the process may proceed to block 414 for processing the next lowest priority window in the set that has not yet been arranged on GUI 102 or otherwise processed.

Referring again to block 416, if sufficient display space is not available on GUI 102, function 120 may determine whether the window can be resized for display on GUI 102 (block 424). If the window can be resized for display on GUI 102, the window is resized (block 426). The window may be resized by adjusting the size of the window in the vertical direction and/or the horizontal direction. The size of the window may be reduced to a size that is small enough to fit in an available display space of GUI 102. Alternatively, the size of the window may be adjusted to a size for fitting the window by increasing the size of the window if another window has been reduced in size by an event. The size of the window may not be reduced to a size less than the minimum dimensions for the window. In one embodiment, function 120 may determine whether the window can be resized along its preferred axis to fit the available space of GUI 102 without reducing the size of the window below its minimum dimension. If the window cannot be resized to a small enough size along its preferred axis to fit the available space of GUI 102, function 120 may determine whether the window can be resized along its other axis to fit the available space of GUI 102 without reducing the size of the window below its minimum dimension. If the window cannot fit within the available space of GUI 102 at its minimum dimensions, the window may be reduced in size to its minimum dimensions (block 428) for covering a low priority portion of a lower priority window. Alternatively, the size of a window may be increased in the vertical and/or horizontal directions when an event occurs that closes or reduces the size of another window.

In block 430, the window may be displayed on GUI 102 to cover a low priority portion of a lower priority window. Further, in block 430 the lower priority window may be moved and/or resized. As stated above, the relative priorities of windows may be determined at block 404, and the relative priorities of portions of the windows may be determined at block 406. When a portion of a window is resized or a portion of the window covered, information regarding an unused portion of the window (e.g., white space in the margins) may be hidden from view on the display of GUI 102 by resizing the window or covering the unused portion. For example, it may be preferred to cover white space over text or pictures in a window. Next, the process may proceed to block 420 to determine whether there is another window for display. As a result of the arrangement process, a higher priority window may cover a lower priority portion of a lower priority window to provide for a simultaneous viewing of the higher priority window and a higher priority portion of the lower priority window. Further, the lower priority window may be resized and moved for providing more display space for the higher priority window and positioning the higher priority window in a better location.

According to one embodiment, the window management function may determine a relationship of windows with one another. For example, applications may be closely related to one another because the windows associated with the applications may be opened simultaneously to perform a task. The synergistic nature of applications is recognized for arranging windows on a GUI. For example, an e-mail application may be synergistic with a chat application but not with a camera software update application. If a user selects windows for arrangement by a window management function, the portions of the windows that have synergy with the highest priority window may be considered to have a high priority. A window having synergy with a high priority window may be assigned with a new priority that is higher than its previous priority based on its synergy with the highest priority window. Further, when a user interacts with a window, the window becomes the highest priority window and the priority of a window having synergy with the highest priority window may be rearranged based on its association with the highest priority window. A user may interact with a window by positioning a cursor on the window. Further, gaze equipment may be included for determining a portion of a window to which a user's eyes are directed, and the window portion to which the user's eyes are directed may be assigned the highest priority among the displayed windows.

In one example, a user may want to initiate a task for putting contact information into a message to send to another person. The contact information may be contained in an address book application. The user may open windows for a messaging application and the address book application with a window management function. The applications may be defined as being synergistic. The user may interact with the window of the address book application for searching for an address. Since the applications are synergistic, the portion of the address book window that includes the address search results may be assigned a high priority so that the messaging window does not cover the portion containing the search results. Further, for example, a selected portion containing information of a contact in the window may have a higher priority over the other portions containing contact information.

According to one embodiment, the number of windows managed by the window management function may be limited. The number of windows practically arranged by the window management function may be limited. For example, the function may not be able to practically manage 100 windows on a typical GUI.

FIGS. 8A-8D illustrate screen displays of exemplary windows 800, 802, 804, and 806 having different priorities and portions having different priorities according to one embodiment of the subject matter described herein. Windows 800, 802, 804, and 806 may be associated with a set selected by a user for display on a display screen. FIGS. 9A-9D illustrate screen displays of the sequential display and arrangement of windows 800, 802, 804, and 806 shown in FIGS. 8A-8D on a display screen 900 according to one embodiment of the subject matter described herein. Referring to FIGS. 8A-8D, window 800 has a higher priority than windows 802, 804, and 806. Window 802 has the next highest priority besides window 800. Window 806 has the lowest priority among the windows. Window 804 has a higher priority than window 806 and a lower priority than window 802. The priority of windows may be based on their selection for display by a user.

Portions of windows 800, 802, 804, and 806 are designated according to their priority relative to the other portions of the same window. The portions are designated 1-5 according to priority with the highest priority being designated 1 and the lowest priority being designated 5. Arrows 808, 810, 812, and 814 indicate the preferred axis for windows 800, 802, 804, and 806, respectively.

Referring to FIG. 9A, window 806 may be the first window positioned on display screen 900 because the window has the lowest priority among the set. Window 806 may be resized small enough to fit within display screen 900.

Referring to FIG. 9B, window 804 may be positioned on display screen 900. Further, window 806 may be reduced in size to fit with window 804 on display because window 806 has a lower priority than window 804. Window 806 may be reduced in size to its minimum dimensions if necessary to fit window 806 with window 804. Further, if window 806 is reduced to its minimum size and does not fit with window 804, window 804 may cover a low priority portion of window 806. In this example, windows 804 and 806 are positioned on display screen 900 without reducing the size of window 806 or covering window 806. Further, window 804 is positioned in a preferred position of display screen 900 at the upper left portion. Window 806 is moved.

Referring to FIG. 9C, window 802 may be positioned on display screen 900 and cover portions of windows 804 and 806. Recall that window 804 as a whole has a higher priority than window 806. Accordingly, lower priority portions of window 806 are covered by window 804. Window 802 may be reduced to its minimum size. Window 804 is positioned above window 806 on the right portion of display screen 900. Window 806 is positioned on the preferred left portion of display screen 900.

Referring to FIG. 9D, window 800 may be positioned on display screen 900 and cover low priority portions of windows 802 and 804. Window 800 may be reduced to its minimum size. Windows 802, 804, and 806 are moved to a lower portion of display screen 900.

According to one embodiment, the display of windows on a GUI may be dynamically adjusted based on an event affecting the relative priority of one of the windows. Referring again to FIG. 1, system 100 includes means for simultaneously displaying a plurality of windows on a GUI where at least one of sizes and positions of the windows are set according to relative priorities of the windows and of portions of the windows. As stated above, functions 120, 122, and 124 may operate together for simultaneously displaying a plurality of windows on GUI 102. At least one of the sizes and positions of the windows are set according to relative priorities of the windows and of portions of the windows.

System 100 may also include a means for detecting an event affecting the relative priority of at least one of the windows. For example, window management function 120 may detect an event affecting the relative priority of at least one of the displayed windows. The event may be a user accessing one of the windows or closing one of the windows. A window may be closed by removing a sub-icon associated with the window from a display organizer icon. For example, a user may close the window by selecting the close button in the window's title bar, by "right-clicking" on a mouse and selecting close, or by "clicking-and-dragging" the window's sub-icons off of the display organizer icon.

Further, system 100 may include a means for dynamically adjusting at least one of the sizes and positions of the windows based on the detected event such that a higher priority window covers a lower priority portion of a lower priority window to provide for a simultaneous viewing of the higher priority window and a higher priority portion of the lower priority window. For example, function 120 may dynamically adjust at least one of the sizes and position of the windows based on the detected event such that a higher priority window covers a lower priority portion of a lower priority window.

Figure 10:
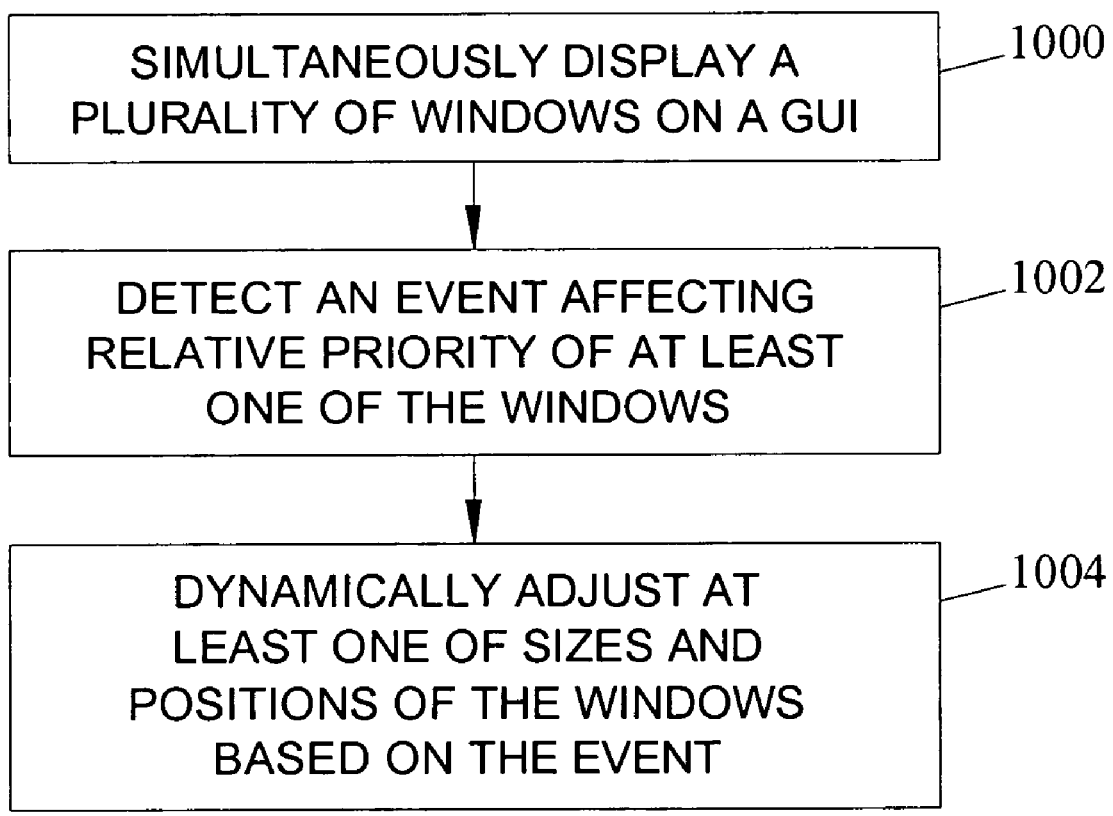
FIG. 10 is a flow chart of an exemplary process for dynamically adjusting display of a plurality of windows on a GUI according to an embodiment of the subject matter described herein.

FIG. 10 is a flow chart illustrating an exemplary process for dynamically adjusting display of a plurality of windows on a GUI according to an embodiment of the subject matter described herein. Referring to FIG. 10, block 1000 includes simultaneously displaying a plurality of windows on a GUI where at least one of sizes and positions of the windows are set according to relative priorities of the windows and of portions of the windows. In block 1002, an event affecting the relative priority of at least one of the windows is detected. Further, at least one of the sizes and positions of the windows may be adjusted based on the detected event (block 1004). The windows may be adjusted such that a higher priority window covers a lower priority portion of a lower priority window to provide for a simultaneous viewing of the higher priority window and a higher priority portion of the lower priority window.

Figure 11:
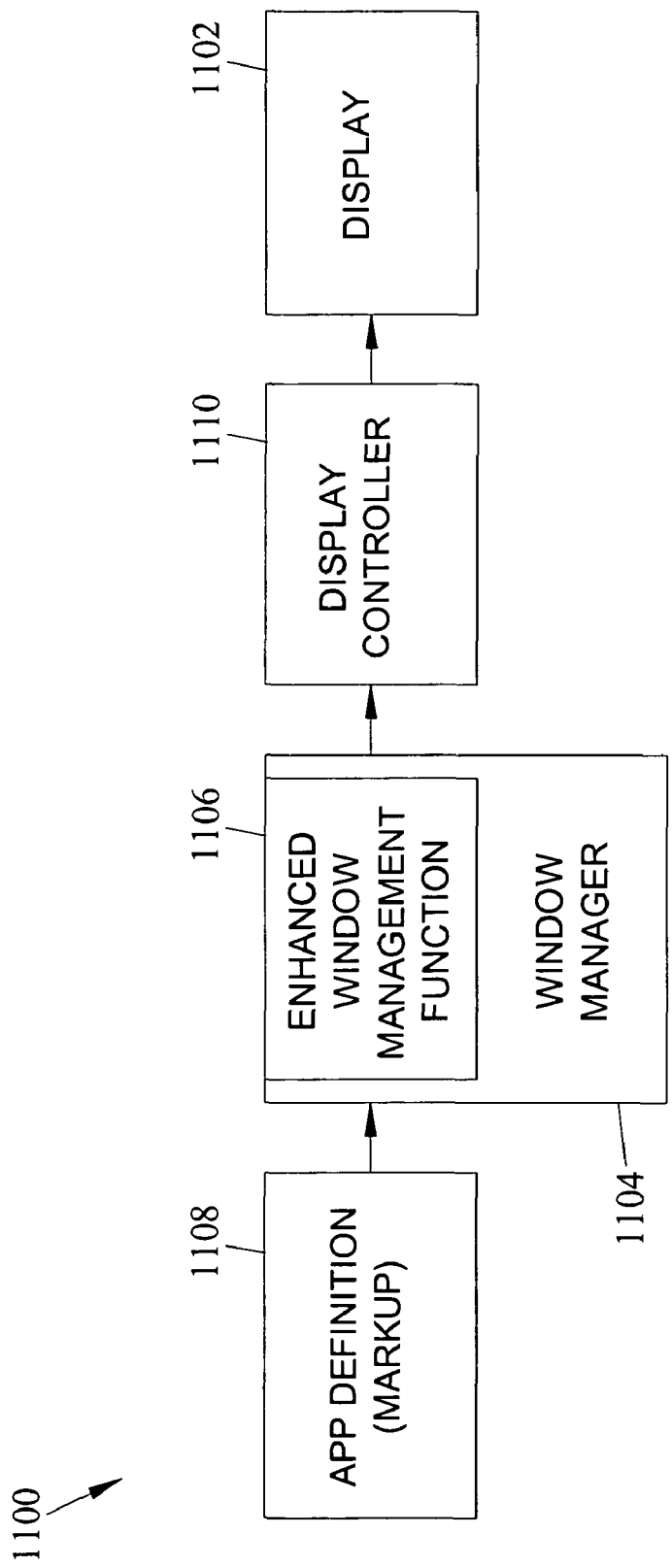
FIG. 11 is a block diagram illustrating an exemplary system for displaying windows on a GUI according to an embodiment of the subject matter described herein.

FIG. 11 illustrates an example of a system 1100 for displaying windows on a display 1102 according to an embodiment of the subject matter described herein. Referring to FIG. 11, system 1100 includes a windows manager 1104 and an enhanced window management function 1106. Window manager 1104 may be a conventional window manager such as that provided by any of the WINDOWS® operating systems available from Microsoft Corporation. Window management function 1106 may manage the display of windows on display 1102 in accordance with the subject matter described herein.

According to one embodiment, applications may be specified by an application definition function 1108. Function 1108 may include instructions in a markup language, such as XML user interface language (XUL) (available from Mozilla Foundation of Mountain View, Calif.) and extensible application markup language (XAML) (available from the Microsoft Corporation). A markup language may aide a programmer to specify the components that compose an application. The markup language may be translated into procedural invocations on an application programming interface (API) of window manager 1104 or interpreted by window manager 1104. Manager 1104 may interpret a markup language or intercept procedure invocations made to manager 1104. Further, function 1108 may specify the relative priorities of portions of windows for display. A markup language may support extensibility such that relative priorities of window portions may be added by a programmer. Based on the relative priorities of portions of a window for display, function 1106 may send instructions to a display controller 1110 for controlling display 1102 to display the window according to the subject matter described herein.

Figure 12:
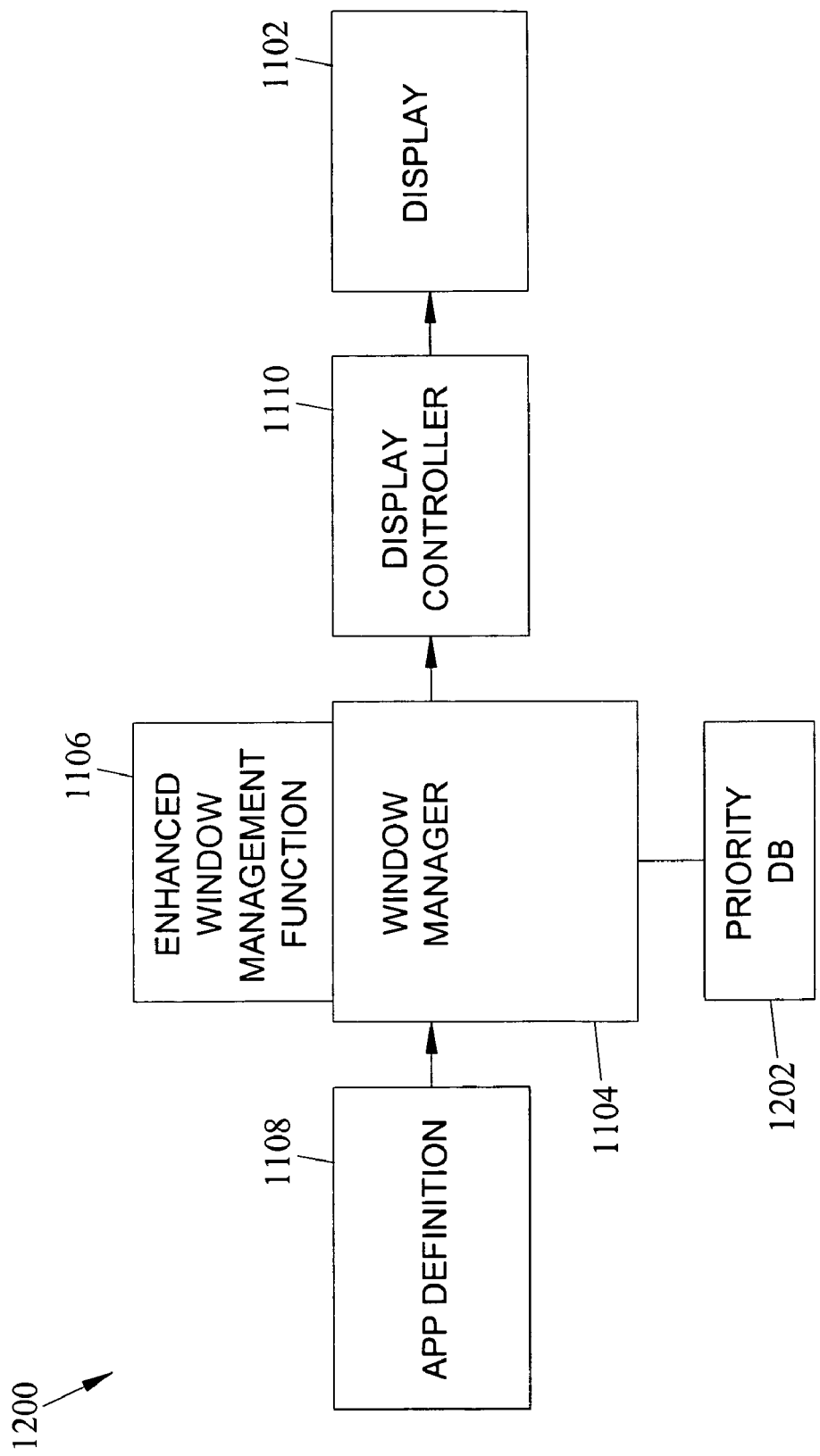
FIG. 12 is a block diagram illustrating another exemplary system for displaying windows on a GUI according to an embodiment of the subject matter described herein.

FIG. 12 illustrates an example of another system 1200 for displaying windows on display 1102 according to an embodiment of the subject matter described herein. Referring to FIG. 12, system 1200 operates similar to system 1100 shown in FIG. 11. System 1200 further includes a priority database 1202 for maintaining priorities of windows and portions of windows generated by applications. Windows and assigned priorities may be associated by identifiers. Function 1106 may retrieve the priority of a window from database 1202 for arranging the window on display 1102 according to the subject matter described herein.

The subject matter described herein provides the advantage of displaying windows on a GUI in a way that considers several factors about the windows. For example, systems and methods described herein determine optimal display utilization of GUI display space. Further, the subject matter described herein allows a user to define the relative priorities of a set of windows to be displayed.

In one embodiment, a window management function as described herein and a conventional window management function, such as provided by any of the WINDOWS® operating systems, may operate in parallel. The window management function may be utilized on a task-by-task basis. For a particular task, a user may open or select windows for arrangement by the window management function. Once the task is complete, the user may close the window management function for the task and initiate the window management function for a different task. Windows may not be closed just because the window management function is closed. The windows may still be operating based on the conventional window management function. Further, multiple instances of the window management function described herein may simultaneously operate for managing and displaying windows associated with different tasks.

In another embodiment, a user may select between the display of windows by a window management function as described herein and a conventional window management function such as that provided by any of the WINDOWS® operating systems. Thus, the user is provided with options for the display of windows on a GUI.

In one embodiment, a desktop window may be provided on a GUI. The desktop window may be a view of the desktop as a window on a display organizer icon. For example, the upper-right quadrant of a display screen may include a view of the desktop. A user may "click-and-drag" an application window from the upper-left quadrant display organizer to the recycle bin to remove the window. Thus, the user may be able to view the desktop when a GUI is otherwise filled with windows.

In another embodiment, a user may "click-and-drag" an icon associated with a window out of a display organizer icon for removing the window from management and display by a window management function. In response, the window management function may dynamically adjust the display of other windows managed by the function according to the subject matter described herein. The other windows may be dynamically adjusted based on the relative priorities of the windows and based on the relative priorities of the portions.

In another embodiment, a system according to the subject matter described herein may learn that a particular user has a tendency to delete particular portions of a window. Thus, these portions of the window are not as important to the user as other portions. A priority may be assigned to a portion of the window based on the user's interaction with the portion. For example, the time that the portion is kept open by a user relative to the total amount of time that the window is kept open may be measured. The time may be averaged over a predetermined number of instances of the window (e.g., 10 times that the window is opened). For example, in one application, the main portion of a window may be viewed 220 out of 220 times that the window is open, and the thumbnails sidebar portion of the window may be viewed 11 out of 220 times. Based on these measurements, the thumbnails sidebar portion may be assigned a lower priority.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for displaying windows on a graphical user interface, the method comprising:
   determining relative priorities of a plurality of windows of a graphical user interface;
   determining relative priorities of a plurality of portions of a plurality of the plurality of windows based in part on user input; and
   automatically arranging the windows on the graphical user interface based on the relative priorities of the windows and based on the relative priorities of the portions such that at least one higher priority window covers a lower priority portion of at least one lower priority window to provide for a simultaneous viewing of the at least one higher priority window and a higher priority portion of the at least one lower priority window, wherein automatically arranging the windows includes dynamically arranging the windows when at least one of at least one relative priority of the relative priorities of the windows and at least one of the relative priorities of the plurality of portions changes,
   wherein at least one of the preceding actions is performed on at least one electronic hardware component.

2. The method of claim 1 wherein determining relative priorities of a plurality of windows includes receiving user input for determining the relative priorities of the windows.

3. The method of claim 2 wherein receiving user input for determining the relative priorities of the windows includes displaying a display organizer for receiving input from a user for associating the plurality of windows with the display organizer, the display organizer displayed as an icon.

4. The method of claim 1 wherein determining relative priorities of a plurality of windows includes determining relative priorities of a group of windows corresponding to applications selected by a user to perform a task, wherein the relative priorities are based on the task.

5. The method of claim 1 wherein determining relative priorities of a plurality of windows includes:
   determining a position of a cursor with respect to the displayed windows; and
   assigning priorities to the windows based on the position of the cursor.

6. The method of claim 5 wherein determining a position of the cursor includes determining which window or portion is selected via user input to the graphical user interface.

7. The method of claim 5 wherein determining a position of the cursor includes determining whether the cursor is on one of the displayed windows, and wherein assigning relative priorities to the windows includes assigning a higher priority to the window on which the cursor is located than to the remaining windows.

8. The method of claim 5 wherein determining a position of the cursor includes determining whether the cursor is on one of the plurality of portions, and wherein assigning relative priorities to the portions includes assigning a higher priority to the portion on which the cursor is located than to the remaining portions.

9. The method of claim 1 wherein determining relative priorities of a plurality of portions of a plurality of the plurality of windows includes receiving priority identifiers for the plurality of portions from an application associated with the plurality of the plurality of windows.

10. The method of claim 1 comprising receiving user input identifying an additional window for display, and re-organizing display of the plurality of windows in the graphical user interface for displaying the additional window in response to the user input.

11. The method of claim 10 wherein re-organizing display of the windows for displaying the additional window includes determining a relative priority of the additional window with respect to the plurality of windows and displaying the additional window with the plurality of windows according to the relative priorities.

12. The method of claim 1 wherein automatically arranging the windows in the graphical user interface includes resizing one of the windows based on the relative priorities of the windows and based on the relative priorities of portions of the plurality of the plurality of windows.

13. The method of claim 12 wherein resizing one of the windows includes adjusting the size of the one window in a vertical direction.

14. The method of claim 12 wherein resizing one of the windows includes adjusting the size of the one window in a horizontal direction.

15. The method of claim 12 wherein resizing one of the windows includes not reducing the size of the one window beyond a minimal acceptable size specified for the window.

16. A method for dynamically adjusting display of a plurality of windows on a graphical user interface, the method comprising:
    simultaneously displaying a plurality of windows on a graphical user interface where at least one of sizes and positions of the plurality of windows are set according to relative priorities of the plurality of windows and relative priorities of portions of the plurality of windows, the relative priorities of the plurality of windows and relative priorities of portions of the plurality of windows based in part on user input;
    detecting an event affecting the relative priority of at least one of the plurality of windows; and
    dynamically adjusting the at least one of sizes and positions of the plurality of windows based on the event such that at least one higher priority window covers at least one lower priority portion of at least one lower priority window to provide for a simultaneous viewing of the at least one higher priority window and a higher priority portion of the at least one lower priority window,
    wherein at least one of the preceding actions is performed on at least one electronic hardware component.

17. The method of claim 16 wherein detecting the event includes detecting that one of the windows is being accessed by a user.

18. The method of claim 16 wherein detecting the event includes detecting that one of the windows is being closed by a user.

19. A system for displaying windows on a graphical user interface, the system comprising system components including:
    a window priority function configured to determine relative priorities of a plurality of windows of a graphical user interface;

a window portion priority function configured to determine relative priorities of a plurality of portions of a plurality of the plurality of windows based in part on user input; and a window management function configured to automatically arrange the windows on the graphical user interface based on the relative priorities of the windows and based on the relative priorities of the portions such that at least one higher priority window covers a lower priority portion of at least one lower priority window to provide for a simultaneous viewing of the at least one higher priority window and a higher priority portion of the at least one lower priority window, wherein automatically arranging the windows includes dynamically arranging the windows when at least one of at least one relative priority of the relative priorities of the windows and at least one relative priority of the relative priorities of the plurality of portions changes, wherein at least one of the system components includes at least one electronic hardware component.

20. The system of claim 19 wherein the window priority function is operable to receive user input for determining the relative priorities of the plurality of windows.

21. The system of claim 20 wherein the window priority function is operable to control the graphical user interface for displaying a display organizer for receiving input from a user for associating the plurality of windows with the display organizer, the display organizer displayed as an icon.

22. The system of claim 19 wherein the window priority function is operable to determine relative priorities of a group of windows corresponding to applications selected by a user to perform a task, wherein the relative priorities are based on the task.

23. The system of claim 19 wherein the window priority function is operable to determine a position of a cursor with respect to the displayed windows, and the window priority function is operable to assign priorities to the plurality of windows based on the position of the cursor.

24. The system of claim 23 wherein the window priority function is operable to determine which window or portion is selected via user input to the graphical user interface.

25. The system of claim 23 wherein the window priority function is operable to determine whether the cursor is on one of the displayed windows, and wherein the window priority function is operable to assign a higher priority to the window on which the cursor is located than to the remaining windows.

26. The system of claim 23 wherein the window portion priority function is operable to determine whether the cursor is on one of the plurality of portions, and wherein the window portion priority function is operable to assign a higher priority to the portion on which the cursor is located than to the remaining portions.

27. The system of claim 19 wherein the window portion priority function is operable to receive priority identifiers for the plurality of portions from an application associated with the plurality of the plurality of windows.

28. The system of claim 19 wherein the window management function is operable to receive user input identifying an additional window for display, and operable to re-organize display of the plurality of windows in the graphical user interface for displaying the additional window in response to the user input.

29. The system of claim 28 wherein the window management function is operable to determine a relative priority of the additional window with respect to the plurality of windows and display the additional window with the plurality of windows according to the relative priorities.

30. The system of claim 19 wherein the window management function is operable to resize one of the windows based on the relative priorities of the windows and based on the relative priorities of portions of the plurality of the plurality of windows.

31. The system of claim 30 wherein the window management function is operable to adjust the size of the one window in a vertical direction.

32. The system of claim 30 wherein the window management function is operable to adjust the size of the one window in a horizontal direction.

33. The system of claim 30 wherein the window management function is operable to not reduce the size of the one window beyond a minimal acceptable size specified for the window.

34. A system for dynamically adjusting display of a plurality of windows on a graphical user interface, the system comprising system components including:

a graphical user interface operable to simultaneously display a plurality of windows where at least one of sizes and positions of the plurality of windows are set according to relative priorities of the plurality of windows and relative priorities of portions of the plurality of windows, the relative priorities of the plurality of windows and relative priorities of the portions of the plurality of windows based in part on user input; and a window management function operable to detect an event affecting the relative priority of at least one of the plurality of windows, and dynamically adjust the at least one of sizes and positions of the plurality of windows based on the event such that at least one higher priority window covers at least one lower priority portion of at least one lower priority window to provide for a simultaneous viewing of the at least one higher priority window and a higher priority portion of the at least one lower priority window, wherein at least one of the system components includes at least one electronic hardware component.

35. The system of claim 34 wherein the event includes detecting that one of the plurality of windows is being accessed by a user and the window management function is operable to detect that one of the plurality of windows is being accessed by a user.

36. The system of claim 34 wherein the event includes detecting that one of the plurality of windows is being closed by a user and the window management function is operable to detect that the one of the plurality of windows is being closed by a user.

37. A system for displaying windows on a graphical user interface, the system comprising components including:

means for determining relative priorities of a plurality of windows of a graphical user interface;

means for determining relative priorities of a plurality of portions of a plurality of the plurality of windows based in part on user input; and means for automatically arranging the windows on the graphical user interface based on the relative priorities of the windows and based on the relative priorities of the portions such that at least one higher priority window covers at least one lower priority portion of at least one lower priority window to provide for a simultaneous viewing of the at least one higher priority window and a higher priority portion of the at least one lower priority window, wherein automatically arranging the windows includes dynamically arranging the windows when at least one of at least one relative priority of the relative priorities of the windows and at least one of the relative priorities of the plurality of portions changes, wherein at least one of the means includes at least one electronic hardware component.

38. A system for dynamically adjusting display of a plurality of windows on a graphical user interface, the system comprising components including:

means for simultaneously displaying a plurality of windows on a graphical user interface where at least one of sizes and positions of the plurality of windows are set according to relative priorities of the plurality of windows and relative priorities of portions of the plurality of windows, the relative priorities of the plurality of windows and relative priorities of portions of the plurality of windows based in part on user input;

means for detecting an event affecting the relative priority of at least one of the plurality of windows; and means for dynamically adjusting the at least one of sizes and positions of the plurality of windows based on the event such that at least one higher priority window covers at least one lower priority portion of at least one lower priority window to provide for a simultaneous viewing of the at least one higher priority window and a higher priority portion of the at least one lower priority window, wherein at least one of the means includes at least one electronic hardware component.

39. A computer program product comprising computer executable instructions embodied in a non-transitory computer readable medium for performing steps comprising:

determining relative priorities of a plurality of windows of a graphical user interface;

determining relative priorities of a plurality of portions of a plurality of the plurality of windows based in part on user input; and automatically arranging the windows on the graphical user interface based on the relative priorities of the windows and based on the relative priorities of the portions, wherein at least one higher priority window covers at least one lower priority portion of at least one lower priority window to provide for a simultaneous viewing of the at least one higher priority window and a higher priority portion of the at least one lower priority window, wherein automatically arranging the windows includes dynamically arranging the windows when at least one of at least one relative priority of the relative priorities of the windows and at least one of the relative priorities of the plurality of portions changes.

40. A computer program product comprising computer executable instructions embodied in a non-transitory computer readable medium for performing steps comprising:

simultaneously displaying a plurality of windows on a graphical user interface where at least one of sizes and positions of the plurality of windows are set according to relative priorities of the plurality of windows and relative priorities of portions of the plurality of windows, the relative priorities of the plurality of windows and relative priorities of portions of the plurality of windows based in part on user input;

detecting an event affecting the relative priority of at least one of the windows; and dynamically adjusting the at least one of sizes and positions of the plurality of windows based on the event such that at least one higher priority window covers at least one lower priority portion of at least one lower priority window to provide for a simultaneous viewing of the at least one higher priority window and a higher priority portion of the at least one lower priority window.

\* \* \* \* \*